Nov. 24, 1970 R. J. PEFFER ET AL 3,542,944

AUTOMATIC BRIGHTNESS CONTROL SYSTEM

Filed April 26, 1968 2 Sheets-Sheet 1

INVENTORS
ROBERT J. PEFFER,
GEORGE C. WAYBRIGHT &
ROBERT C. WHEELER

BY

Cyril A. Krenzer

ATTORNEY

INVENTORS
ROBERT J. PEFFER,
GEORGE C. WAYBRIGHT &
ROBERT C. WHEELER
BY
Cyril C. Kunzer
ATTORNEY United States Patent Office 3,542,944

Patented Nov. 24, 1970

3,542,944

AUTOMATIC BRIGHTNESS CONTROL SYSTEM

Robert John Peffer and George Cleveland Waybright, Batavia, and Robert Charles Wheeler, Elba, N.Y., assignors to Sylvania Electric Products Inc., a corporation of Delaware Filed Apr. 26, 1968, Ser. No. 724,431
Int. Cl. H04n *5/20*
U.S. Cl. 178—5.2 12 Claims

ABSTRACT OF THE DISCLOSURE

In an integrated electrical to optical and optical to electrical signal transducer system, the optical to electrical portion includes an automatic brightness control system and DC restoration and gamma correction circuitry having a common reference potential level. The automatic brightness control system develops feedback control signals in response to the magnitude of video signals to vary the intensity of the electron beam and light emitted by a flying spot scanner tube whereby the video signals are developed. Also, the common reference potential level of the DC restoration and gamma correction circuitry not only provides a common reference for a plurality of channels eliminating tracking problms, but also provides a uniform level of signal for application to the gamma correction means virtually eliminating adjustments therein.

BACKGROUND OF THE INVENTION

Generally, apparatus suitable to the provision of a visual display derived from both televised signals and photographic film is of the "commercial" rather than "consumer" variety. In other words, "commercial" broadcast systems usually include a television camera and a film presenting means to provide signals suitable for use by the owner of a television receiver.

However, one form of "consumer" type apparatus suitable for displaying both televised programs and film slides is disclosed in copending application Ser. No. 657,623 entitled "Color Reproduction System" filed Aug. 1, 1967 and assigned to the assignee of the present application. Therein, an integrated electrical to optical and optical to electrical signal transducer system having common components provides an image reproduction in response to either televised signals or signals derived from a photographic film.

The optical to electrical portion of the above "consumer" type apparatus is preferably in the form of a flying spot scanning systm. Normally, such scanning systems include a flying spot scanner tube, a film holder having a film disposed therein, a signal transmitter including the usual light splitting and photoelectric optical apparatus, and a signal processing means.

Usually, the signal processing means of flying spot scanner apparatus includes some form of DC restoration and gamma correction means. Probably, the most common type of DC restoration means is the so-called "keyed-clamp" type wherein a pair of balanced pulse signals of opposite polarity are developed and applied to a pair of balanced diodes. Also, one of the more popular form of gamma corrector is a series connected diode and alterable resistor whereby bias adjustments provide approximate "tracking" in a plurality of channels.

Unfortunately, each of the above-mentioned DC restoration and gamma correction means leaves something to be desired. For example, the known keyed-clamp type of DC restoration means not only requires some means for providing balanced pulse signals of opposite polarity but also requires relatively expensive precision components to provide the desired balance of the operable pair of diodes. Also, known gamma correction circuitry requires numerous and complex bias adjustments to provide necessary tracking of a plurality of channels.

Additionally, flying spot scanner systems normally include some form of apparatus for automatically controlling the brightness of the displayed image. In this respect, the only known form of automatic brightness control means is provided by gain adjustment of the individual photomultipliers in the signal transmitter.

However, it has been found that such systems are relatively complex, expensive, and difficult to adjust with any degree of precision. Moreover, a three color system having three separate channels would require variations in each one of the channels and these variations must be such that the resultant signals from all of the channels "track" or vary in a similar manner with one another. Obviously, such a requirement is difficult, requiring relatively complex, expensive and involved circuitry.

OBJECTS AND SUMMARY OF THE INVENTION

Therefore, it is an object of the present invention to provide an enhanced integrated electrical to optical and optical to electrical signal transducer system. A further object of the invention is to provide an enhanced automatic brightness control system for an optical to electrical signal transducer. A still further object of the invention is to provide an improved optical to electrical color signal transducer having means for automatically varying the intensity of an electron beam of a flying spot type tube in accordance with the light transmitted by a transparent film.

These and other objects and advantages are achieved in one aspect of the invention by an optical to electrical portion including an automatic brightness control system wherein a detector and amplifier means provides a feedback signal for controlling the beam current and light intensity of a flying spot tube in response to variations in the amplitude of video signals derived from apparatus associated with the flying spot tube.

DESCRIPTION OF THE PREFERRED EMBODIMENT

For a better understanding of the present invention, together with other and further objects, advantages and capabilities thereof, reference is made to the following disclosure and appended claims in connection with the accompanying drawings. Also, the preferred embodiment will be discussed in terms of an integral television receiver and flying spot scanner system suitable for deriving a color image reproduction in response to either color television signals or color photographic films.

Figure 1:
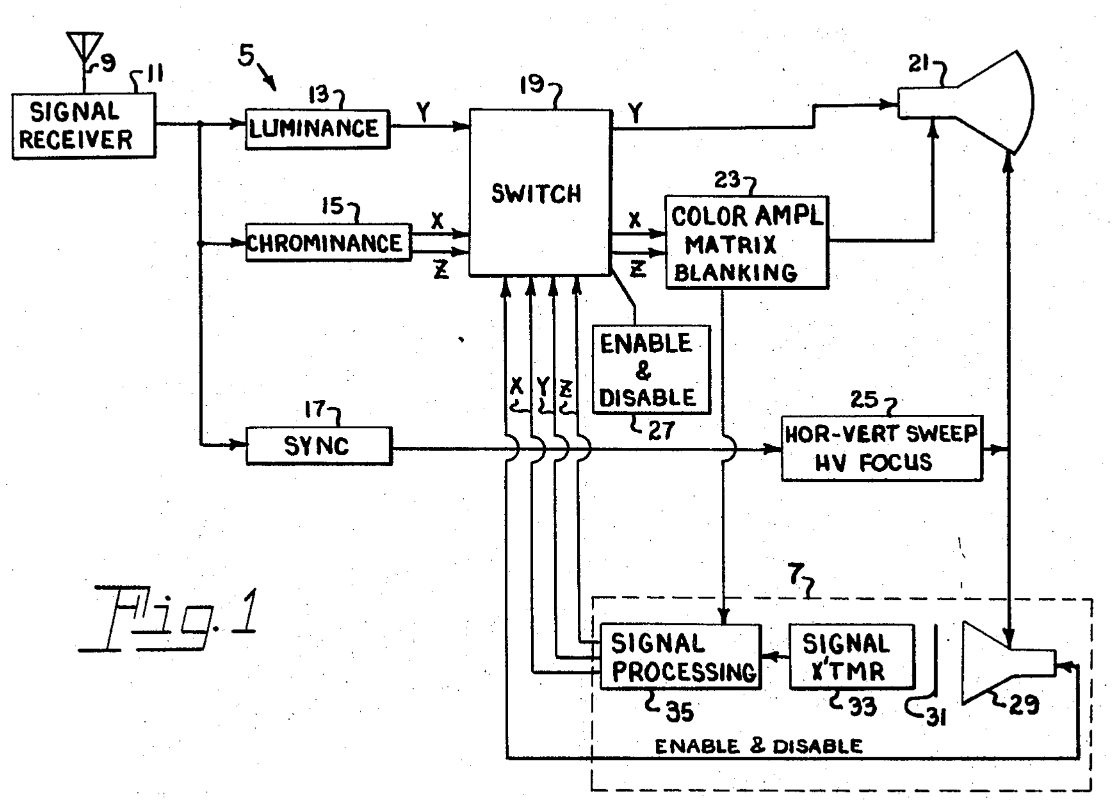
FIG. 1 is a block diagram illustrating an integrated electrical to optical and optical to electrical signal transducer system.

Referring to the drawings, FIG. 1 is a diagrammatic illustration, in block form, of an integrated electrical to optical and optical to electrical signal transducer system. The electrical to optical signal transducer 5 is illustrated in the form of a modified color television receiver while the optical to electrical signal transducer 7 is in the form of a flying spot scanner system. The electrical to optical signal transducer 5 has the capability of providing an image display in response to broadcast televised signal while the optical to electrical signal transducer 7 develops signals from photographic film and applies these signals to the electrical to optical signal transducer 5 to produce an image display.

Generally, the electrical to optical signal transducer 5 or modified color television receiver, includes the usual antenna 9 and signal receiver 11. The antenna 9 intercepts a broadcast television signal which is coupled to the signal receiver 11 to provide a composite color signal. This composite color signal is applied to a luminance channel 13, a chrominance channel 15, and a synchronization channel 17.

The luminance channel 13 provides a $y$ signal representative of brightness information which may be applied via a switch means 19 to a color cathode ray tube display device 21. Also, the chrominance channel 15 provides $x$ and $z$ signals, in a manner well known in the art, which may be applied via the switch means 19 and color amplifier, matrix, and blanking network 23 to the display device 21.

The synchronization channel 17 energizes in proper sequence the usual horizontal and vertical sweep circuitry, high voltage, and focus voltage circuitry, block 25, whereby desired potentials are applied to the display device 21 and associated apparatus (not shown). Moreover, an enable and disable means 27 is coupled to the switch means 19 for purposes to be explained hereinafter.

As to the optical to electrical signal transducer portion 7 or flying spot scanner, a flying spot scanner tube 29 is coupled to the sweep and high voltage circuitry, block 25, and via the switch means 19 to the enable and disable means 27. A signal transmitter 33 including the usual photoelectric and optical means is spaced from the flying spot scanner tube 29 on an opposite side of a film holder 31. Also, signals available from the signal transmitter 33 are coupled via a signal processing network 35 to the switching means 19.

As explained in detail in the previously mentioned copending application entitled "Color Reproduction System," the switching means 19 serves to selectively couple received color television signals or color signals derived from photographic film to the display device 21. Thus, a viewer selects a program broadcast or personal film slides for observation on the display device 21.

Figure 2:
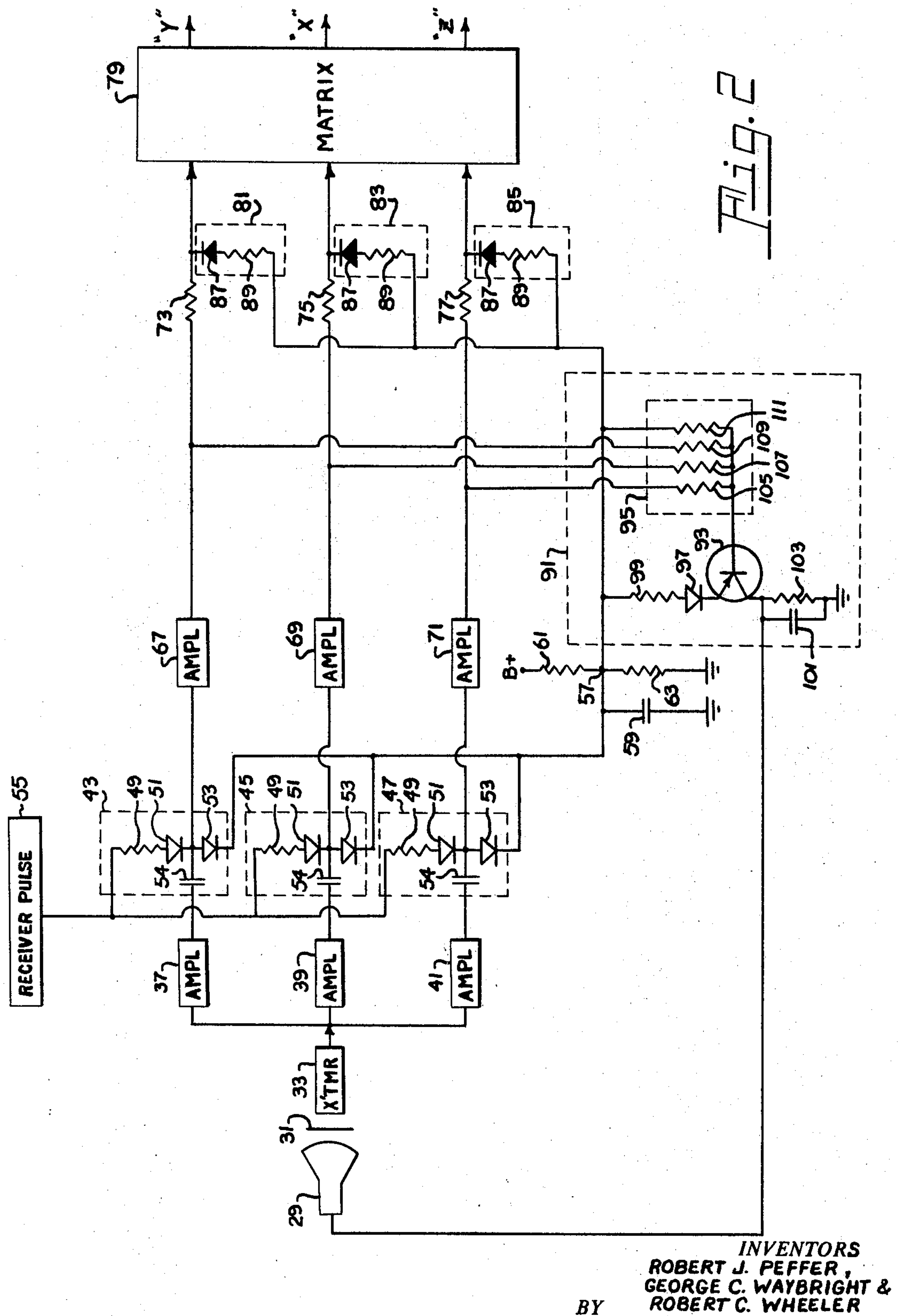
FIG. 2 is a combination block and schematic diagram illustrating one form of DC restoration and gamma correction circuitry and an automatic brightness control system.

Referring more specifically to the optical to electrical signal transducer 7, illustrated in FIG. 2 in the form of a flying spot scanner system, the system includes the usual flying spot scanner tube 29, a film holder 31 disposed in the vicinity of the scanner tube 29, a signal transmitter 33 including photoelectric and optical systems adjacent the film holder 31, and a signal processing network 35. This network 35 couples signals from the signal transmitter 33 to the switch means 19 of the electrical to optical signal transducer 5.

The signal processing network 35 includes first, second, and third video amplifier stages 37, 39, and 41 coupling signals from the signal transmitter 33 to first, second and third DC restorer stages 43, 45, and 47 respectively. Each of the DC restorer stages 43, 45, and 47 includes a series connected resistor 49 and a pair of diodes 51 and 53 as well as a capacitor 54 coupled to the junction of the diodes 51 and 53. The DC restorer stages 43, 45, and 47 are connected intermediate a pulse signal source 55 and a potential reference level 57. The potential reference level 57 is AC coupled to circuit ground by a filter capacitor 59 and to the junction of a pair of resistors 61 and 63 series connected intermediate a potential source B+ and circuit ground.

The capacitor 54 in each of the DC restorer stages 43, 45, and 47 couples the video signals from each of the video amplifier stages 37, 39, and 41 to the junction of the series connected diodes 51 and 53 which are directly connected to the amplifier stages 67, 69, and 71. Output signals appearing at each of the amplifier stages 67, 69, and 71 are coupled via resistors 73, 75, and 77 to a matrix network 79 wherein luminance and chrominance signals $y$, and $x$ and $z$ signals, are developed for application to the electrical to optical signal transducer 5.

Also, a gamma corrector means 81, 83, and 85 is coupled intermediate the junction of each of the resistors 73, 75, and 77 with the matrix network 79 and the potential reference level 57. In this instance, each of the gamma corrector means 81, 83, and 85 includes a series connected diode 87 and resistor 89. However, it is obvious that other and additional configurations are appropriate and applicable to provide the degree of gamma correction desired.

Additionally, the illustration of FIG. 2 includes a preferred embodiment of an automatic brightness control system. The system includes a detector and amplifier means 91 having a transistor 93 coupled via a resistor matrix 95 to each one of the amplifier stages 67, 69, and 71. The emitter of the transistor 93 is coupled via a series connected diode 97 and resistor 99 to the potential reference level 57 which was previously described in connection with the DC restoration and gamma corrector means.

Also, the collector of the transistor 93 is coupled via a parallel connected capacitor 101 and resistor 103 to circuit ground and to the flying spot scanner tube 29 of the optical to electrical signal transducer system 7. Moreover, the base of the transistor 93 is coupled via the resistor matrix 95, to each of the amplifier stages 67, 69, and 71 and to the potential reference level 57. Specifically, first, second, third, and fourth resistors 105, 107, 109, and 111 couple the base of the transistor 93 to the amplifier stages 67, 69, and 71 and the potential reference level 57.

As to the operation, the flying spot scanner system includes a flying spot scanner tube 29 which provides a light beam having an intensity which is dependent upon the velocity of the electron beam therein. This light beam scans a transparent film disposed within the film holder 31 to provide a resultant light having an intensity which is dependent not only upon the light beam applied to the film but also the transmission capability of the film.

The resultant light emitted through the film is applied to a signal transmitter 33 which includes an optical system for splitting the light and a plurality of photoelectric devices for providing video signals representative of the colors red, green, and blue. This derivation of video signals representative of the colors red, green, and blue is well known in the art and these video signals, often referred to as the red, green, and blue video signals, are applied to the signal processing network 35.

The signal processing network 35 includes the video signal amplifier stages 37, 39, and 41 whereto the individual red, green, and blue video signals are applied. After amplification, each of the red, green, and blue video signals is individually applied to one of the DC restorer stages 43, 45, and 47 via capacitor 54.

Each of the DC restorer stages 43, 45, and 47 is coupled to the same potential reference level 67 via a diode 53. Thus, each of the diode 53 and capacitor 54 combinations may be considered to be an ordinary DC restorer wherein the capacitor 54 is charged via the diode 53. Moreover, the potential appearing at the junction of the diode 53 and capacitor 54 will be the sum of voltage of the potential reference level and the voltage drop across the diode 53.

Further, it is well known that an ordinary DC restorer has a tendency to clip an applied signal and also has an efficiency which is dependent upon both charge and discharge paths and times. Therefore, each of the DC restorer stages 43, 45, and 47 includes a series connected resistor 49 and diode 51 coupling the junction of the diode 53 and capacitor 54 to a pulse potential source 55. Also, each diode 53 and capacitor 54 junction is coupled to one of the amplifier stages 67, 69, and 71 respectively. Thus, during the retrace period of each of the video signals, a pulse signal from the pulse potential source 55 is applied to the capacitor 54 via the diode 51 which tends to enhance the charge on each of the capacitors 54. Moreover, the combination of this added pulse potential and the coupled amplifier stages 67, 69, and 71 tends to enhance the discharge path of the DC restorer stages 43, 45, and 47 and provide a substantially uniform black level point or DC restored level for all of the red, blue, and green video signals.

As to gamma correction, each one of the gamma correctors 81, 83, and 85 includes a series connected diode 87 and resistor 89 which are selected to have substantially similar characteristics. In other words, the transfer characteristic curves of each of the gamma correctors 81, 83, and 85 are substantially similar. Also, each of the gamma correctors 81, 83, and 85 is connected to the potential reference level 57 as discussed in regard to the DC restorer stages 43, 45, and 47 and to the junction of the matrix 79 and one of the resistors 73, 75, and 77. Thus a substantially identical level of video signal is applied to each of the substantially similar gamma correctors 81, 83, and 85 having substantially similar transfer characteristic curves.

It should perhaps be noted that a judicious selection of similar components for all of the gamma correctors 81, 83, and 85 in combination with a DC restored signal clamped to the same reference level as the gamma correctors 81, 83, and 85 provides a substantially uniform tracking of a plurality of channels and eliminates numerous circuit complexities and adjustments. Moreover, it is obvious that additional gamma correction can readily be realized by the inclusion of additional stages or semiconductors having different electrical characteristics.

Referring now to the operation of the automatic brightness control system, a light beam having an intensity in accordance with the electron beam intensity of the flying spot scanner tube 29 is applied to a transparent film in the film holder 31. The light transmitted by the transparent film is applied to the signal transmitter 33 which includes the usual light splitting and photoelectric devices to provide video signals representative of the colors red, green, and blue and often referred to as red video, green video, and blue video signals.

These red, green, and blue video signals are individually applied to the video amplifier stages 37, 39, and 41 and, in turn, to the DC restorer stages 43, 45, and 47 amplifier stages 67, 69, and 71. Thus, each of the DC restored red, green, and blue video signals has a magnitude which varies in accordance with the signal transfer capabilities of the signal transmitter 33, the transmissivity of the film in the film holder 31, and the intensity of the light beam available from the flying spot scanner tube 29. Also, the intensity of the light beam from the flying spot scanner tube 29 is dependent upon the intensity of the electron beam of the flying spot scanner tube 29.

Each of these DC restored red, green, and blue video signals is applied to the detector and amplifier means 91 wherein is developed a DC potential which varies in accordance with the magnitude of the DC restored red, green, and blue video signals. This DC potential is fed back to a control electrode of the flying spot scanner tube 29 and serves to control the electron beam intensity and, in turn, the intensity of the light beam emitted by the flying spot scanner tube 29. Thus, the automatic brightness control system automatically varies the electron beam and emitted light of the flying spot scanner tube 29 in accordance with the magnitude of the developed red, green, and blue video signals.

Referring now to the specific embodiment of FIG. 2, the DC restored red, green, and blue video signals available from the amplifier stages 67, 69, and 71 are matrixed through the resistors 105, 107, and 109 into the resistor 111 of the resistor matrix 95. This resistor 111 is coupled intermediate the base of the transistor 93 and the previously-mentioned potential reference level 57 of the DC restorer and gamma corrector circuitry. Also, the emitter of the transistor 93 is ultimately referenced to the potential reference level 57 via the series connected diode 97 and resistor 99. Moreover, the filter capacitor 101 and load resistor 103 tend to average out the collector current to provide the DC feedback signal which is applied to the cathode of the flying spot scanner tube 29.

At this point, several important features of the above-described embodiment should perhaps be noted. For example, it can be readily understood that the ultimate connection of the emitter of the transistor 93 to the potential reference level 57 of the DC restoration and gamma correction circuitry renders both systems subject to substantially the same dynamic variations. In other words, both the DC restoration and gamma correction circuitry and the automatic brightness control system tend to track one another in response to dynamic variations such as line voltage shift for instance.

Also, it may be noted that an inherent delay system is included in the automatic brightness control system. For example, the transistor 93 would not begin to conduct until the forward conduction characteristics of the emitter base junction and the elements in the emitter circuit are overcome. In effect, short circuiting the diode 97 in the emitter circuit of the transistor 93 would leave the forward conduction characteristics, usually about 0.5 volt, of the transistor 93 to be overcome. Thus, the forward conduction characteristic of the transistor 93 tends to delay the action of the automatic brightness control systme to keep it from acting on principally dark scenes. Moreover, this desired delay action is further enhanced by the inclusion of the diode 97 which tends to restrain the reduction of the flying spot scanner tube beam current by the automatic brightness control circuitry until the film scene brightness is of such a magnitude that undesired blooming of the display device 21 of the electrical to optical signal transducer 5 would result. In other words, the transistor 93 will not conduct until the signal level applied to the base thereof is in the vicinity of about 1.0 volt or sufficient to overcome both the forward conduction characteristics of the emitter base junction and the elements in the emitter circuit of the transistor 93.

Further, it is to be noted that the red, green, and blue video signals applied to the detector and amplifier means 91 of the automatic brightness control system have been DC restored but not gamma corrected. Since the DC restored video signals are of a much greater magnitude than the signals after gamma correction and because these DC restored signals are believed to be more representative of peak brightness singals, it is preferable that energization of the automatic brightness control system take place prior to gamma correction.

Additionally, it is well known that the luminance or y portion of the color-video information represents the degree of brightness and would provide a desirable energizing source for the automatic brightness control system. It is also well known that the luminance signal is substantially equal to the sum of about 0.59 green, 0.30 red, and 0.11 blue video signals. Thus, it may readily be seen that a great deal of simplicity and reduction in cost may be achieved by eliminating all of the resistors of the resistor matrix 95 except the one coupled to the green video signal source. In this manner, approximately 60% of the luminance or *y* signal is employed for energization of the automatic brightness control system.

Figure 3:
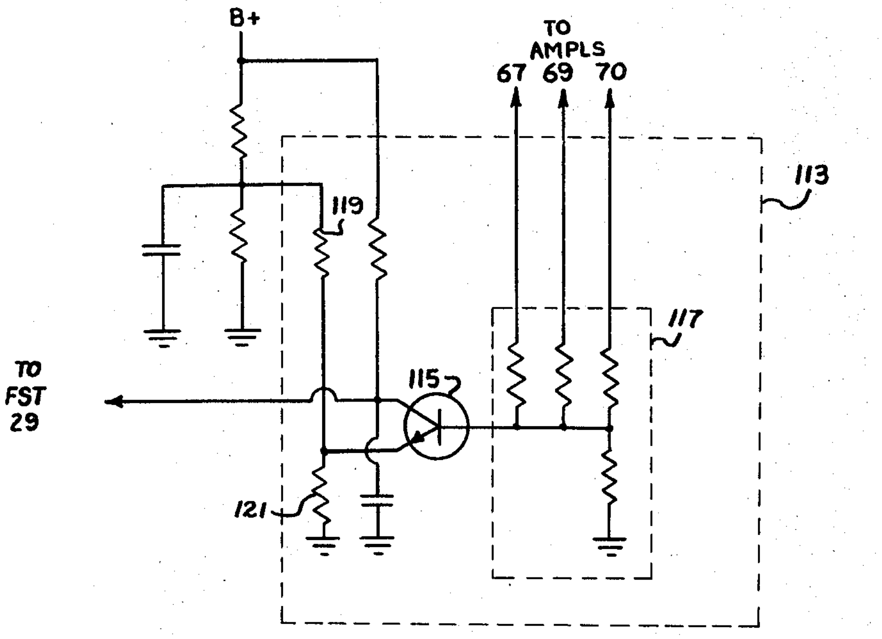
FIG. 3 is a schematic illustration of an alternate detector and amplifier means for the automatic brightness control system of FIG. 2.

Alternatively, FIG. 3 illustrates another embodiment of an automatic brightness control system. Herein, the detector and amplifier means 113 includes a transistor 115 and a resistor matrix network 117. The transistor 115 is of the NPN type while the resistor matrix network 117 is essentially as described with reference to the above-mentioned circuitry. Also, the emitter of the transistor 115 is connected to a bias network including resistors 119 and 121 series connected intermediate the potential reference level 57 and circuit ground.

Essentially, operation is somewhat similar to the apparatus described in FIG. 2. However, in this instance the automatic brightness control system is not referenced precisely to the potential reference level 57 but is critically dependent upon the bias developing circuitry including resistors 119 and 121. Also, the transistor operates in response to signals of opposite polarity or becomes saturated as the signal approaches the black rather than white level. Moreover, this saturation condition is directly dependent upon the bias network of resistors 119 and 121 which assumes a relatively critical role.

Thus, there has been provided a unique automatic brightness control system which virtually eliminates undesired "blooming" of the cathode ray tube of an electrical to optical transducer system by a feedback system in the optical to electrical signal transducer system associated therewith. Moreover, the automatic brightness control system is responsive to video signals resulting from light transmitted by the film to provide inverse variations in the light applied to the film. Thus, the system tends to compensate for both under and over developed films as well as under and over exposed films.

While there has been shown and described what is at present considered the preferred embodiments of the invention, it will be obvious to those skilled in the art that various changes and modifications may be made therein without departing from the invention as defined in the appended claims.

What is claimed is:

1. In an optical to electrical signal transducer, an automatic brightness control system comprising in combination:

- flying spot scanner tube means for developing and applying a light beam of a given intensity to a transparent film;
- photoelectric pickup means associated with said film and responsive to the light beam transmitted therethrough for developing electrical signals representative of the colors red, green, and blue of said film; and
- detector and amplifier means coupling said photoelectric pickup means to said flying spot scanner tube means, said detector and amplifier means including a matrix for summing said electrical signals to cause alteration of intensity of said light beam in inverse relationship to the intensity of the light beam transmitted by said transparent film.

2. The combination of claim 1 wherein said detector and amplifier means includes a resistor coupled to said photoelectric pickup means providing an electrical signal representative of the color green, said signal serving to effect alteration of the intensity of said light beam in inverse relationship to the intensity of the light beam transmitted by said transparent film.

3. The combination of claim 1 wherein said detector and amplifier means includes an electron device having an input electrode coupled to a potential source, an output electrode coupled to said flying spot scanner tube means, and a control electrode responsive to said electrical signals of said photoelectric pickup means, said electron device having a conduction characteristic serving to delay alteration of said light beam intensity of said flying spot scanner tube means by said electrical signals.

4. The combination of claim 1 wherein said detector and amplifier means includes an electron device having an input electrode coupled to a potential source, an output electrode coupled to a potential reference level and said flying spot scanner tube means, and a control electrode responsive to said electrical signals of said photoelectric pickup means, said electron device having a conduction characteristic serving to delay alterations of said light beam intensity of said flying spot scanner tube means by said electrical signals.

5. The combination of claim 4 including an impedance coupling said input electrode of said electron device to said potential source, said impedance acting in conjunction with said conduction characteristics of said electron device to effect delay in alteration of said light beam intensity of said flying spot scanner tube means by said electrical signals.

6. The combination of claim 3 including an impedance coupling said input electrode of said electron device to said potential source, said impedance acting in conjunction with said conduction characteristics of said electron device to effect delay in alteration of said light beam intensity by said electrical signals.

7. The combination of claim 4 wherein said impedance is in the form of a diode.

8. In a combination electrical to optical and optical to electrical color signal transducer reproduction system wherein the electrical to optical signal transducer includes an image reproducer responsive to signals from the electrical to optical and optical to electrical signal transducers, an automatic brightness control system comprising in combination:

- flying spot scanner tube means for developing and applying a light beam of a given intensity to a transparent film;
- photoelectric pickup means associated with said transparent film and responsive to transmission of said light beam therethrough for developing electrical signals representative of the colors red, green, and blue of said film;
- gamma correction means coupled to said photoelectric pickup means and responsive to said electrical signals for developing and applying gamma corrected electrical signals to said image reproducer of said electrical to optical signal transducer; and
- detector and amplifier means coupled to said photoelectric pickup means and including a resistor matrix for summing said electrical signals and for applying said summed signals to said flying spot scanner tube means to alter the intensity of said light beam inversely with respect to the intensity of said light beam transmitted by said transparent film.

9. The combination of claim 8 wherein said resistor matrix includes an impedance coupled to said electrical signal representative of the color green of said photoelectric pickup means.

10. The combination of claim 8 wherein said detector and amplifier means includes an electron device having an input electrode coupled to a potential source, an output electrode coupled to said flying spot scanner tube, and a control electrode responsive to said electrical signals of said photoelectric pickup means, said electron device having a conduction characteristic serving to delay alteration of said intensity of said light beam in response to said electrical signals.

11. The combination of claim 10 including an impedance coupling said input electrode of said electron device to said potential source with said impedance combining with said conduction characteristic of said electron device to effect a delay in alteration of said intensity of said light beam in response to said electrical signals.

12. The combination of claim 11 wherein said impedance is in the form of a diode.

References Cited

UNITED STATES PATENTS

| | | | |
|---|---|---|---|
| 2,804,498 | 8/1957 | Thiele | 178—7.2 |
| 2,962,545 | 11/1960 | Dillenburger | 178—5.4 |
| 3,270,131 | 8/1966 | Dinter | 178—6.8 |
| 3,251,936 | 5/1966 | Berchtold | 178—7.2 |
| 3,471,740 | 10/1969 | Dreyfoos et al. | 178—7.5 |

RICHARD MURRAY, Primary Examiner

A. H. EDDLEMAN, Assistant Examiner

U.S. Cl. X.R.

178—6.8